United States Patent
Wang et al.

(10) Patent No.: US 7,115,867 B2
(45) Date of Patent: Oct. 3, 2006

(54) APPARATUS AND METHOD FOR TESTING INFRARED FUNCTIONS

(75) Inventors: Hung-Sheng Wang, Taipei (TW); Shun-Hsien Chao, Taipei (TW)

(73) Assignee: Inventec Corporation, Taipei (TW)

( * ) Notice: Subject to any disclaimer, the term of this patent is extended or adjusted under 35 U.S.C. 154(b) by 337 days.

(21) Appl. No.: 10/768,118

(22) Filed: Feb. 2, 2004

(65) Prior Publication Data

US 2005/0167591 A1    Aug. 4, 2005

(51) Int. Cl.
*G01J 5/00* (2006.01)
(52) U.S. Cl. .................................. 250/338.1
(58) Field of Classification Search ............. 250/338.1
See application file for complete search history.

(56) References Cited

U.S. PATENT DOCUMENTS 6,292,283 B1 * 9/2001 Grandbois .................. 398/107

* cited by examiner

*Primary Examiner*—David Porta
*Assistant Examiner*—Christopher Webb
(74) *Attorney, Agent, or Firm*—Birch, Stewart, Kolasch & Birch, LLP

(57) ABSTRACT

An apparatus and method for testing infrared functions of infrared transceiver modules that is equipped with an infrared transmission capability mainly includes to start test operation before an infrared transceiver module being installed on an electronic device thereby to shorten test time of the infrared transceiver module, reduce test cost and improve production yield of the infrared transceiver module.

9 Claims, 3 Drawing Sheets

APPARATUS AND METHOD FOR TESTING INFRARED FUNCTIONS

FIELD OF THE INVENTION

The present invention relates to an apparatus and method for testing infrared functions of infrared transceiver modules that is equipped with an infrared transmission capability.

BACKGROUND OF THE INVENTION

Nowadays an infrared function has become a highly desirable factor in the selection of electronic instruments. Hence most electronic instruments now are equipped with an infrared transceiver module.

However, during testing of the infrared transceiver module, the infrared transceiver module is often installed on an electronic instrument, then infrared functional tests are performed. Hence two sets of electronic instruments are required to do infrared functional tests. As a result, time needed for infrared functional tests increases, and test costs are higher. There is a negative impact on the production yields of the infrared transceiver module.

SUMMARY OF THE INVENTION

Therefore, the primary object of the invention is to provide an apparatus and method for testing infrared functions, to shorten test time of infrared transceiver modules, reduce test costs, and improve production yields of the infrared transceiver modules.

The apparatus and method for testing infrared functions according to the invention is for testing infrared functions of infrared transceiver modules that is equipped with an infrared transmission capability. The apparatus includes a processor, an infrared test module, a targeted test module and a display device.

The processor emits test signals. The infrared test module is connected to the processor to receive infrared signals (including infrared tested signals and infrared result signals). The tested module receives the installation of the infrared transceiver module and test. After having received the test signals, it emits the infrared tested signals. It includes a transceiver and a controller to respectively emit the infrared tested signals and receive the infrared result signals, and controls receiving and emitting of the infrared tested signals, infrared result signals, and test signals. The targeted test module is for installation and test of an infrared transceiver module, and is connected to the infrared test module to receive the infrared tested signals and test the infrared transceiver. The targeted test module transmits the infrared result signals back to the processor through the infrared test module. The display device also is connected to the processor to receive the infrared result signals for displaying.

When the invention is in use, first, the processor emits test signals; the transceiver of the infrared test module receives the test signals, and transfers to the controller. The controller actuates the transceiver to emit infrared tested signals. The targeted test module receives the infrared tested signals, tests the infrared transceiver module, and sends back infrared result signals. The transceiver of the infrared test module receives the infrared result signals, and through controlling of the controller, sends the infrared result signals back to the processor; the processor then transfers the infrared result signals to the display device for displaying.

By means of the process set forth above, during the test process, it is not necessary to install the infrared transceiver module that has infrared transmission capability on the electronic instrument. Tests may be performed without the infrared transceiver module installed on the electronic instrument. As a result, the test time of the infrared transceiver module may be reduced, test costs are lower, and production yields of the infrared transceiver module may increase.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
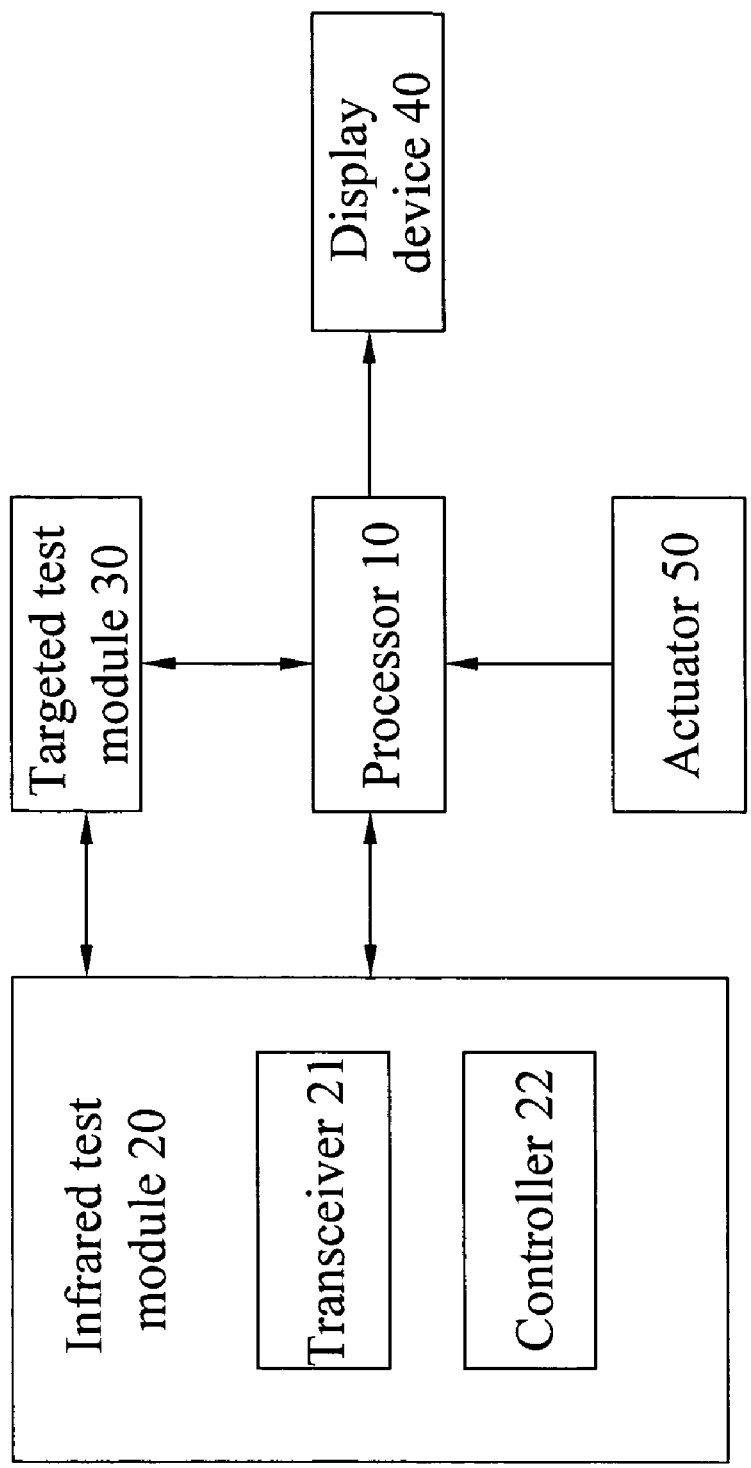
FIG. 1 is a structure block diagram of the invention.

Referring to FIG. 1, the apparatus and method for testing infrared functions of an infrared transceiver module according to the invention includes a processor 10, an infrared test module 20, a targeted test module 30, a display device 40 and an actuator 50.

The processor 10 is for emitting test signals. The infrared test module 20 is connected to the processor 10 to receive and transmit infrared signals (including infrared tested signals and infrared result signals). After having received the test signals, it emits the infrared tested signals. It includes a transceiver 21 and a controller 22 to respectively emit the infrared tested signals and receive the infrared result signals, and controls receiving and emitting of the infrared tested signals, infrared result signals, and test signals. The targeted test module 30 is for the installation of, and testing an infrared transceiver module, and is connected to the infrared test module to test the infrared transceiver module after having received the infrared tested signals. It transmits the infrared result signals back to the processor 10 through the infrared test module 20. It also is connected to the processor 10 to receive the infrared result signals for displaying.

The targeted test module 30 is connected to the processor 10. After the infrared transceiver module is installed on the targeted test module 30, the targeted test module 30 transmits the data of the infrared transceiver module to the display device 40 through the processor 10 for displaying. The data of the infrared transceiver module include name, department, versions, manufacture date, and developer's names of the apparatus, and the like.

The actuator 50 is connected to the processor 10 to drive the processor 10 to emit the test signals when actuated.

Thus to use the invention, the infrared transceiver module that has infrared transmission capability must be installed on the targeted test module 30 first. The targeted test module 30 transmits the data of the infrared transceiver module to the processor 10. The processor 10 transmits the data of the infrared transceiver module to the display device 40, to display. Then the actuator 50 is started to drive the processor 10, to emit test signals. The receiver 21 of the infrared test module 20 receives the test signals, and transmits to the controller 22. The controller 22 actuates the receiver 21 to emit infrared tested signals. The target test module 30 receives the infrared tested signals and tests the infrared transceiver module, and transmits the infrared result signals back to the processor 10. Hence the processor 10 can transmit the infrared result signals to the display device 40 for displaying.

By means of the apparatus set forth above, during the test process, it is not necessary to install first the infrared transceiver module that has infrared transmission capability on the electronic instrument. The test can be performed without having the infrared transceiver module installed on the electronic instrument. As a result, the test time of the infrared transceiver module can be reduced, test costs are lower, and production yields of the infrared transceiver module may increase.

Figure 2A:
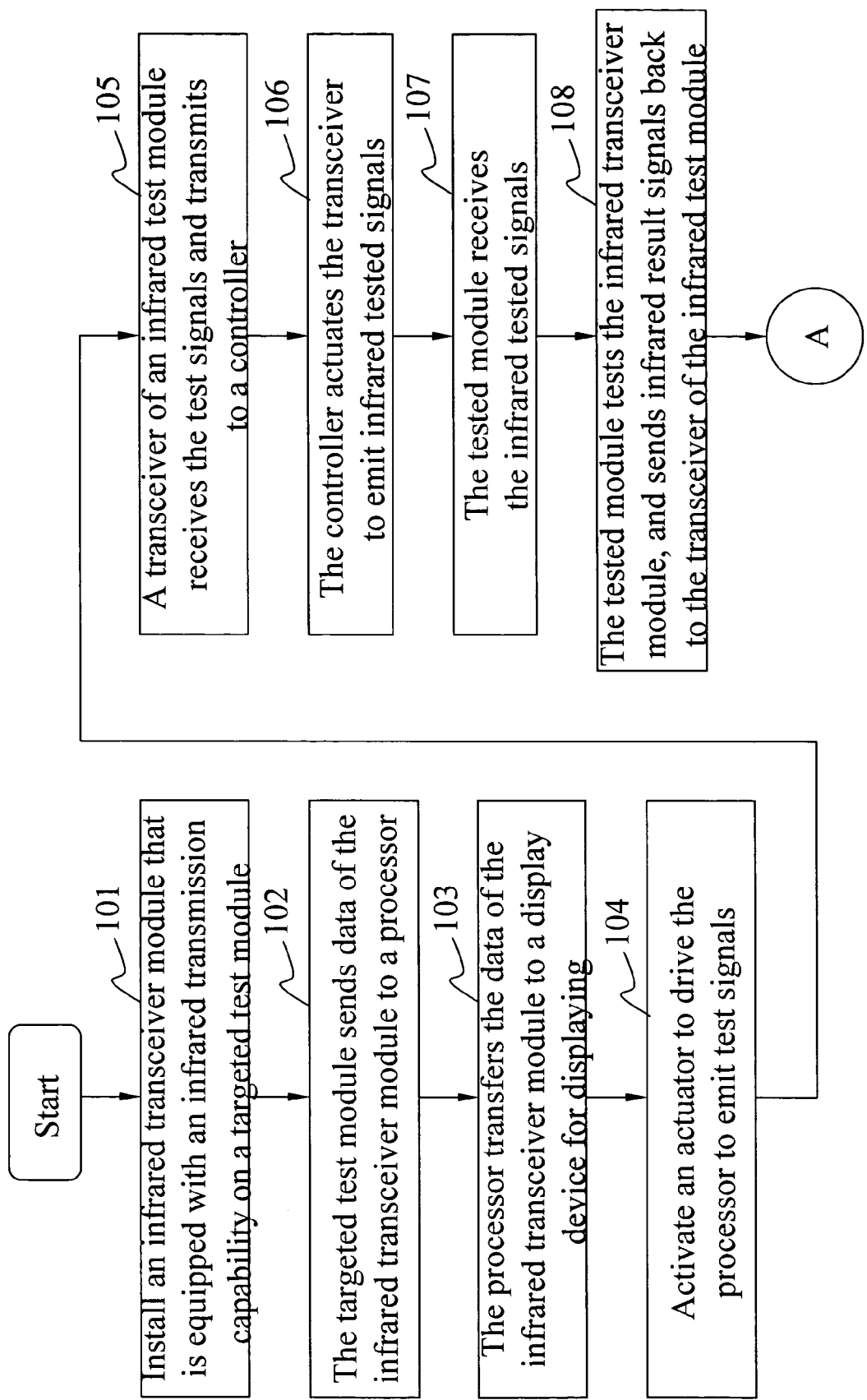
FIGS. 2A and 2B are process flow charts of the invention.
Figure 2B:
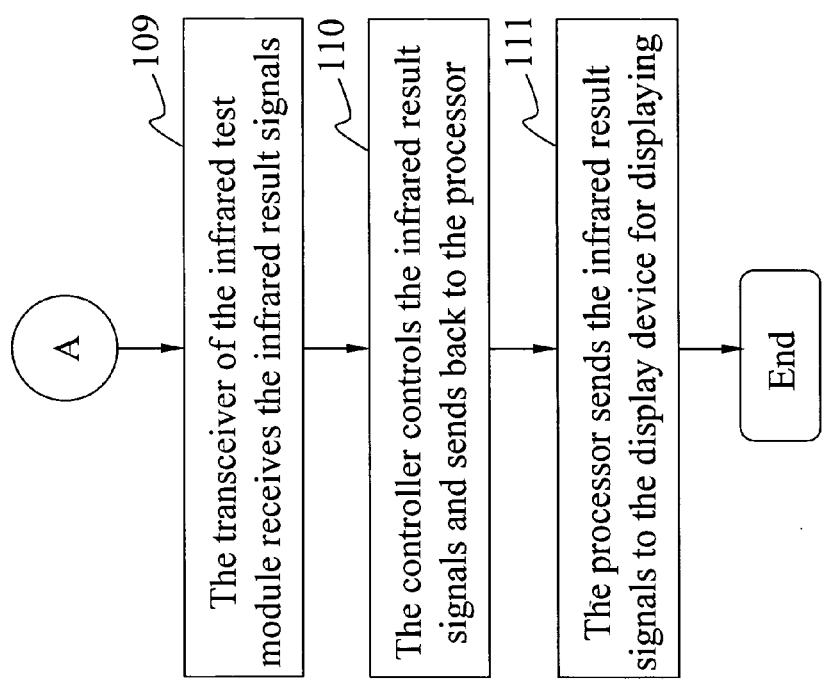

Refer to FIGS. 2A and 2B for the method of testing infrared functions according to the invention. The method includes the steps as follow:

Install an infrared transceiver module that is equipped with an infrared transmission capability on a targeted test module (step 101).

The targeted test module sends data of the infrared transceiver module to a processor (step 102).

The processor transfers the data of the infrared transceiver module to a display device for displaying (step 103).

Activate an actuator to drive the processor to emit test signals (step 104).

A transceiver of an infrared test module receives the test signals and transmits to a controller (step 105).

The controller actuates the transceiver to emit infrared tested signals (step 106).

The tested module receives the infrared tested signals (step 107).

The tested module tests the infrared transceiver module, and sends back infrared result signals to the transceiver of the infrared test module (step 108).

The transceiver of the infrared test module receives the infrared result signals (step 109).

The controller controls the infrared result signals and sends back the processor (step 110).

The processor sends the infrared result signals to the display device for displaying (step 111).

Through the process set forth above, during the test process, it is not necessary to install first the infrared transceiver module that has infrared transmission capability on the electronic instrument. Tests can be performed without having the infrared transceiver module installed on the electronic instrument. As a result, the test time needed for the infrared transceiver module can be reduced, test costs are lower, and production yields of the infrared transceiver module may increase.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An apparatus for testing infrared functions of an infrared transceiver module that is equipped with an infrared transmission capability, comprising:
    a processor for emitting a test signal;
    an infrared test module connected to the processor for emitting an infrared tested signal and receiving an infrared result signal, and emitting the infrared tested signal after having received the test signal;
    a targeted test module connected to the infrared test module to install the infrared transceiver module and test the infrared transceiver module after having received the infrared tested signal, and transmit the infrared result signal back to the processor through the infrared test module for sending out; and
    a display device connected to the processor for receiving the infrared result signal from the processor and displaying the infrared result signal.

2. The apparatus of claim 1, wherein the targeted test module is connected to the processor, the targeted test module transmitting data of the infrared transceiver module to the display device for displaying through the processor after the infrared transceiver module having been installed on the targeted test module.

3. The apparatus of claim 1, wherein the infrared test module further includes a receiver and a controller to respectively emit the infrared tested signal and receive the infrared result signal, and control receiving and transmitting of the infrared tested signal, the infrared result signal and the test signal.

4. The apparatus of claim 1, further including an actuator which is connected to the processor to drive the processor to emit the test signal when activated.

5. A method for testing infrared functions of an infrared transceiver module that is equipped with an infrared transmission capability, comprising steps of:
    installing an infrared transceiver module that is equipped with the infrared transmission capability on a targeted test module;
    activating an actuator to drive a processor to emit a test signal;
    receiving the test signal by an infrared test module which emits an infrared tested signal;
    receiving the infrared tested signal by the targeted test module;
    testing the infrared transceiver module by the targeted test module which sends a infrared result signal back to the infrared test module;
    receiving the infrared result signal by the infrared test module which sends the infrared result signal back to the processor; and
    transferring the infrared result signal from the processor to a display device for displaying the infrared result signal.

6. The method of claim 5, wherein the step of receiving the test signal by an infrared test module which emits an infrared tested signal further includes steps of:
    receiving the test signal by a transceiver of the infrared test module and transmitting to a controller; and
    actuating the transceiver to emit the infrared tested signal by the controller.

7. The method of claim 6, wherein the step of testing the infrared transceiver module by the targeted test module which sends a infrared result signal back the infrared test module is sending the infrared result signal back to the transceiver of the infrared test module.

8. The method of claim 7, wherein the step of receiving the infrared result signal by the infrared test module which sends the infrared result signal back to the processor further includes the transceiver of the infrared test module receiving the infrared result signal and the controller controlling the infrared result signal and sending back to the processor.

9. The method of claim 5, wherein the step of installing an infrared transceiver module that is equipped with the infrared transmission capability on a targeted test module is followed by the steps of:
    sending data of the infrared transceiver module to the processor by the targeted test module; and
    sending the data of the infrared transceiver module to the display device for displaying the data by the processor.

* * * * *